United States Patent
Winter et al.

[11] Patent Number: 6,130,638
[45] Date of Patent: Oct. 10, 2000

[54] METHOD AND DEVICE FOR DETERMINING AN AZIMUTH ANGLE AND/OR AN ELEVATION ANGLE IN A MULTIBEAM RADAR SYSTEM

[75] Inventors: Klaus Winter, Schwieberdingen; Klaus-Peter Wagner, Stuttgart, both of Germany

[73] Assignee: Robert Bosch GmbH, Stuttgart, Germany

[21] Appl. No.: 09/182,449

[22] Filed: Oct. 29, 1998

[30] Foreign Application Priority Data

Nov. 4, 1997 [DE] Germany ............... 197 48 604

[51] Int. Cl.[7] ............... G01S 13/00; G01S 13/68
[52] U.S. Cl. ............... 342/147; 342/134; 342/139; 342/140; 342/146; 342/194; 342/195
[58] Field of Search ............... 342/118, 134, 342/139, 140, 146, 148, 156, 190, 191, 192, 193, 194, 195, 196, 197, 104, 107, 108, 113, 127, 133, 145, 147, 189, 378, 74, 81, 117; 702/57, 66, 69, 71, 72, 79, 80

[56] References Cited

U.S. PATENT DOCUMENTS

| | | | |
|---|---|---|---|
| 4,320,400 | 3/1982 | Chasek | 342/378 |
| 5,579,010 | 11/1996 | Iihoshi et al. | 342/108 X |

FOREIGN PATENT DOCUMENTS

| | | |
|---|---|---|
| 0 684 486 | 11/1995 | European Pat. Off. . |
| 195 26 448 | 1/1997 | Germany . |
| 2 253 758 | 9/1992 | United Kingdom . |
| WO96/30779 | 10/1996 | WIPO . |
| WO 97/20229 | 6/1997 | WIPO ............... G01S 13/48 |
| WO97/20229 | 6/1997 | WIPO . |

*Primary Examiner*—Bernarr E. Gregory
*Attorney, Agent, or Firm*—Kenyon & Kenyon

[57] ABSTRACT

Method and device for determining an azimuth angle and/or an elevation angle, based on a multibeam radar system, in which the echo signals of each radar target are recorded over at least two beams. The amplitude of an echo signal recorded in each receiving beam is normalized. For each receiving beam, the normalized amplitude is compared to the pattern values of an antenna pattern stored and normalized for this beam in order to determine the angle of a radar target. The comparison results from at least two receiving beams are combined to form an angle-dependent analysis quantity, and the angle whose angle-dependent analysis quantity meets a minimum and maximum criterion is determined to be the angle of the radar target. Included in the angle-dependent analysis quantity is a phase angle of at least two recorded echo signals. This operation can also be performed on the basis of a complex normalization operation.

7 Claims, 3 Drawing Sheets

METHOD AND DEVICE FOR DETERMINING AN AZIMUTH ANGLE AND/ OR AN ELEVATION ANGLE IN A MULTIBEAM RADAR SYSTEM

FIELD OF THE INVENTION

The present invention relates to a method for determining an azimuth and/or an elevation angle. The present invention also relates to a device for carrying out the method, and thus a multibeam radar system in which the method according to the present invention for determining an azimuth and/or an elevation angle is implemented.

BACKGROUND INFORMATION

A determination of an angle (azimuth and/or elevation) has long been one of the unique functions of many radar systems. Because of this, numerous methods are known which can be used to determine the angle in this manner. Essentially, there are two different approaches. According to the first approach, the lobe of a sending antenna and a receiving antenna of the radar system is rotated mechanically or electronically on the plane of the angle being sought. This makes it possible to determine the location or angular position of the radar target detected based on the position of the antenna lobe at the time that an echo signal is recorded. According to the second approach, echo signals of detected radar targets are recorded over multiple antenna lobes of a multibeam radar system, and the angular position of the radar target is determined by analyzing the echo signals obtained from the individual antenna lobes. The monopulse method is one known example of this second approach. With this method, echo signals are recorded simultaneously over two antenna lobes, and the angle of one radar target is determined on the basis of an amplitude and/or phase difference in the echo signals recorded over the separate antenna lobes. A radar system with this type of angle analysis is described, for example, in European Patent Application No. 0 766 100. A device for determining an angle of incidence of recorded radar signals is also described in U.S. Pat. No. 4,320,400, with the angle of incidence here also being determined on the basis of an amplitude and a phase comparison between radar signals that were recorded over multiple antennas.

A method that differs from that described in these documents, but which still falls under the second approach, is described in International Patent Publication No. WO 97/20229, according to which, in a radar system which is used in particular in motor vehicles, the angle in which a detected radar target is located is determined by recording the echo signals of the radar target (whose amplitudes are normalized) via at least two receiving channels and comparing them to stored normalized values of a two-way antenna pattern of the radar system. An important advantage of this method over the method described above is that it eliminates the need for precisely symmetrical antenna lobes, since this method does not compare the received signals with each other, but instead compares the received echo signals to stored reference values. This reduces the effort and therefore, of course, also the costs of producing this type of radar system. However, it has been demonstrated that, in the case of angular positions in which nulls appear in the antenna pattern of the receiving elements, ambiguities in determining the angle can be avoided only with additional effort. This additional effort involves making the nulls less pronounced by "deforming" the antenna pattern. However, this effort is also associated with a lower overall antenna gain.

SUMMARY OF THE INVENTION

An object of the present invention is to provide a method, and a radar system based on the method, having an improved angle analysis which eliminates the disadvantages described above.

An advantage of the present invention, as compared to the method described in International Patent Publication No. WO 97/20229, is that an accuracy in determining the angular position of a detected radar target is considerably improved. In addition, it is not necessary to deform the antenna pattern in order to avoid ambiguities in the area of the nulls in the antenna pattern. At the same time, the method according to the present invention can be implemented very easily and, in particular, very economically, since the additional storage space and computer power required are very low.

Compared to the conventional monopulse methods, the present invention has the advantage that radar systems based thereon have a larger detection range while maintaining the same bearing discrimination, since, unlike the conventional monopulse method, the method according to the present invention can use any number of receiving beams for the analysis. In addition, the present invention makes it possible to analyze all receiving beams almost simultaneously. Compared to the other known radar systems that use electronically rotated receiving beams that are activated individually in sequence, this also provides the advantage of considerably reducing coherence problems in analyzing the phase information.

DETAILED DESCRIPTION

Figure 1:
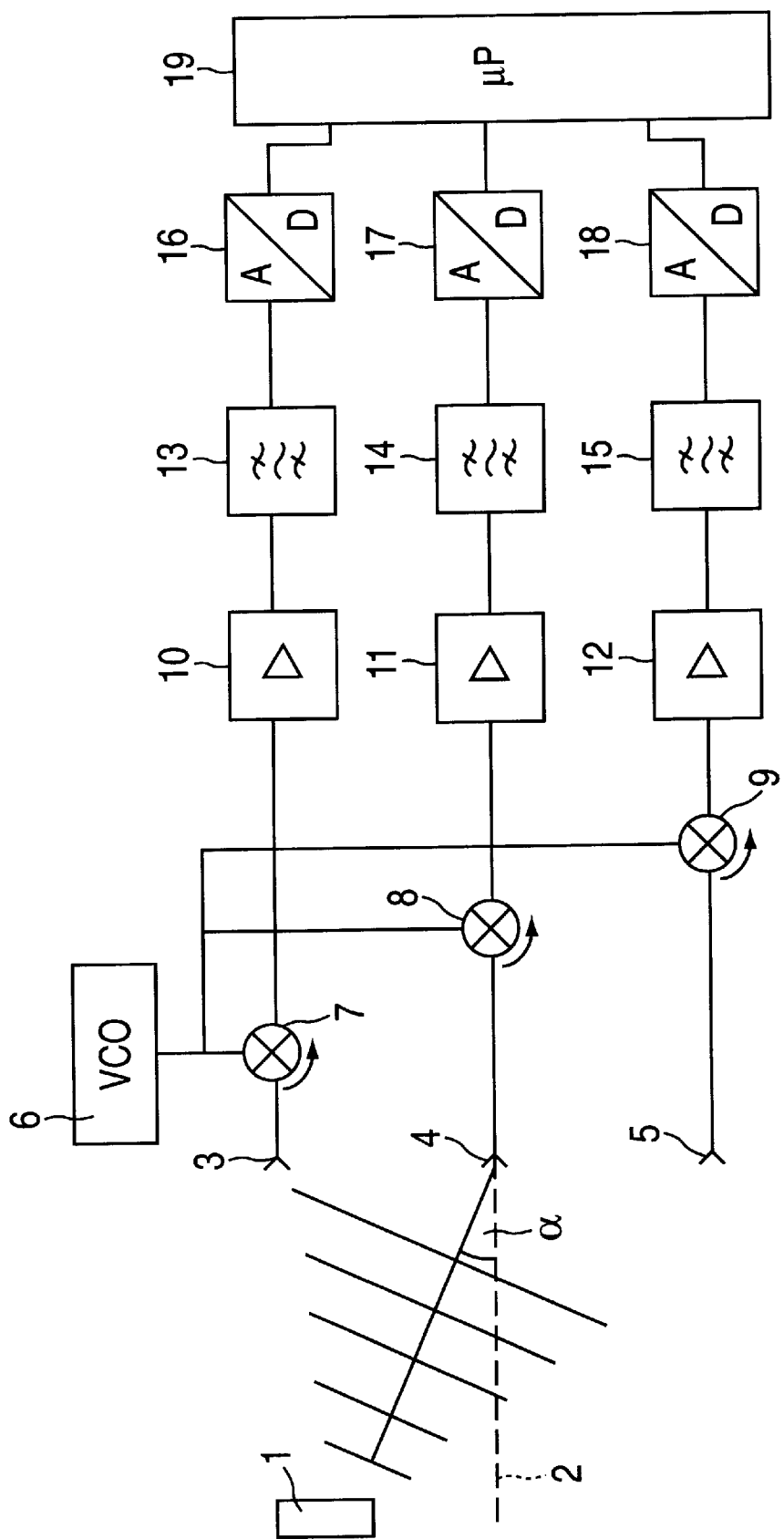
FIG. 1 shows a block diagram of a three-beam radar system described in International Patent Publication No. WO 97/20229.

In FIG. 1, three send/receive elements 3,4,5 are connected to three dual rat race rings 7, 8, 9. The dual rat race rings 7, 8, 9 combine the functions of a receiving mixer with those of a duplexer or a circulator, and the operation and construction of which are described in Great Britain Patent Application No. 2 290 000. In addition, each of dual rat race rings 7, 8, 9 receives the output signal of a voltage-controlled oscillator 6. The output signals of the three rat race rings 7, 8, 9 are supplied via amplifiers 10, 11, 12 and filters 13, 14, 15 to analog/digital converters 16, 17, 18, respectively, which are connected by their outputs to an analysis computer 19. A detected radar target 1 is a target from which a wave front is reflected to send/receive elements 3, 4, 5 at an angle a to optical axis 2 of the radar system.

Figure 2:
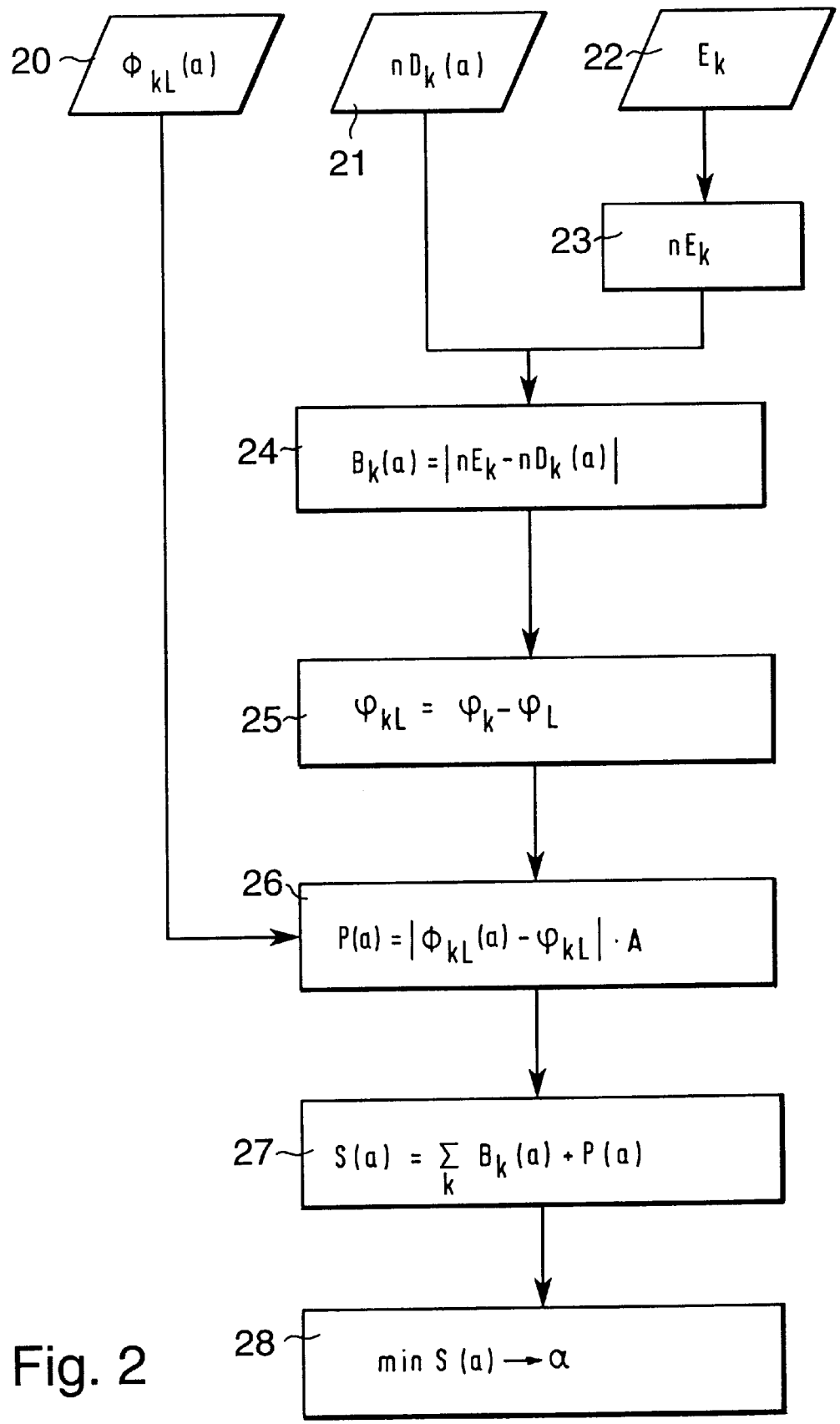
FIG. 2 shows a flow chart of a first embodiment of the method according to the present invention.

FIG. 2 shows a flow chart of a first embodiment of the method according to the present invention. This method builds on the method described in International Patent Publication No. WO 97/20229, the entire disclosure of which is incorporated herein by reference. As shown in Block 21, normalized pattern values $nD_k(a)$ of the antenna patterns of k receiving beams of the radar system are stored in a memory area of analysis computer 19 as a function of an angle index a. For example, k is equal to three for the radar system shown in FIG. 1. The method according to the present invention can also be used in a radar system with two or more than three receiving beams. According to Step 22, echo signals $E_k$, reflected from a detected radar target 1, are recorded over the total of k receiving beams. In Step 23, the amplitudes of recorded echo signals $E_k$ are normalized in the same manner as stored normalized pattern values $nD_k(a)$ from Step 21. This yields a normalized amplitude value $nE_k$ for each receiving beam k. In this case, normalization is preferably carried out on the basis of a cumulative norm, as described in International Patent Publication No. WO 97/20229. In Step 24, normalized amplitudes $nE_k$ of recorded echo signals $E_k$ are compared to stored normalized pattern values $nD_k(a)$. This is preferably done by forming, for each receiving beam k, first difference functions $B_k(a)$ between normalized amplitude $nE_k$ of the echo signal from this receiving beam and stored normalized pattern values $nD_k(a)$ of the antenna pattern of the receiving beam. In Step 25, the present invention then calls for additionally determining a phase difference $\phi_{k1}$, between recorded echo signals $E_k$ from at least two receiving beams k and l. As a modification thereof, multiple phase differences $\phi_{k1}$ can also be formed, for example, between the first and second, between the second and third, and between the first and third receiving beams.

In Step 20, the method according to the present invention provides further storing phase difference values $\phi_{kl}(a)$ as reference or comparison values in a further memory area of analysis computer 19 as a function of angle index a. In Step 26, phase differences $\phi_{k1}$ are now also compared to stored phase difference values $\phi_{kl}(a)$. This is preferably done by forming a second difference function P(a) based on phase difference $\phi_{kl}$ determined between the echo signals from at least two receiving beams k and l and stored phase difference values $\phi_{kl}(a)$. This further difference function P(a) is also weighted by an amplitude factor A. A sum of normalized amplitudes $nE_k$ and $nE_1$ of receiving beams k and 1, between which phase difference $\phi_{k1}$ is formed, is preferably used as amplitude factor A. If phase difference $\phi_{k1}$ is generated between the first and third receiving beams, as is the case, for example, in a first embodiment of the present invention, the sum $(nE_1+nE_3)$ is advantageously selected as the amplitude factor A. Due to this weighting, second difference function P(a), which is based on a phase comparison, is mapped to a quantity comparable to the first differential functions, which are based on an amplitude comparison.

In Step 27, the results of the amplitude comparison obtained in Step 24 from at least two receiving beams are combined with the comparison result obtained in Step 26. This is preferably done by forming an angle-dependent analysis quantity S(a) from at least two of the first and second differential functions through addition. However, angle-dependent analysis quantity S(a) is advantageously formed via all difference functions from Step 24 of all k receiving beams and via the second difference function from Step 26. In Step 28, the angle or angle index a whose angle-dependent analysis quantity S(a) meets a minimum or maximum criterion is determined as angle of the radar system. The angle for which analysis quantity S(a) formed in Step 27 reaches a minimum limit is preferably assumed as the probable angle of the radar target.

Figure 3:
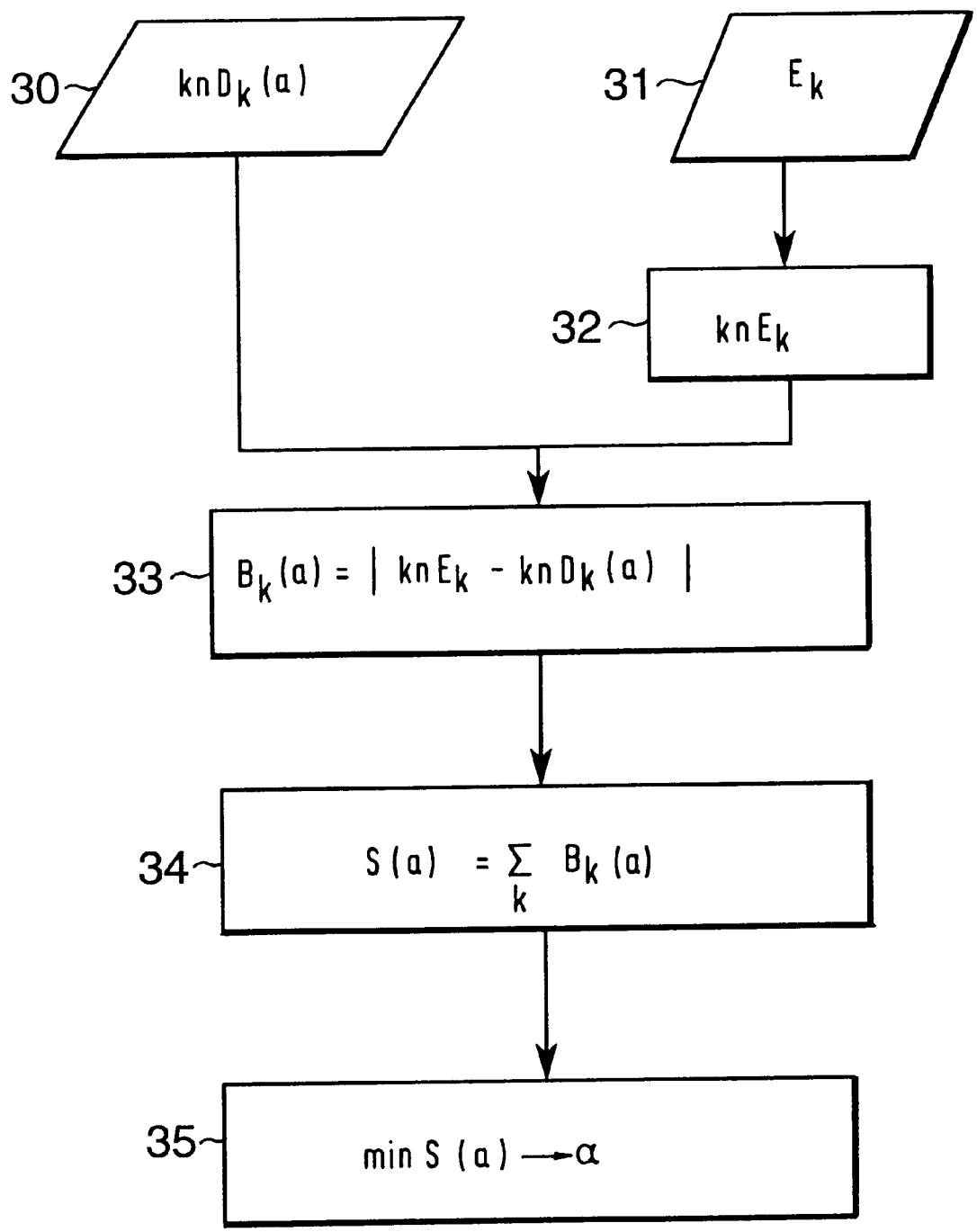
FIG. 3 shows a flow chart of a second embodiment of the method according to the present invention.

FIG. 3 shows a second embodiment of the present invention. Unlike the first embodiment, the phase angle of recorded echo signals in the second embodiment are subjected to a new normalization operation according to the present invention and thus analyzed. This embodiment therefore has the further advantage that the additional storage of phase difference values $\phi_{kl}(a)$ is unnecessary. The new normalization operation according to this embodiment of the present invention is preferably carried out with a cumulative norm, however with complex signal values containing both an amplitude and a phase being used. For example, a possible and especially suitable norm for a three-beam radar system is:

$$N_1 = \frac{|1 - m|}{|1| + |m| + |r|}$$

$$N_2 = \frac{|m - r|}{|1| + |m| + |r|}$$

$$N_3 = \frac{|r - 1|}{|1| + |m| + |r|}$$

Where

| | |
|---|---|
| $N_1, N_2, N_3$ | are normalized signal or pattern values, |
| l | is a complex signal or pattern value from the left-hand receiving beam, |
| m | is a complex signal or pattern value from the middle receiving beam, |
| r | is a complex signal or pattern value from the right-hand signal beam, and |
| $|.|$ | forms the absolute value of the complex signal or pattern values. |

In the case of normalized values $N_1$, $N_2$, $N_3$, combining complex signal or pattern values from multiple receiving beams in the counter of this normalization operation eliminates the need to assign the values to a single receiving beam. However, this is not a disadvantage, since no information is lost. Nevertheless, the following normalization operation, which is also possible, includes a unique assignment again:

$$N_1 = \frac{|1|}{|1 + m + r|}$$

$$N_m = \frac{|m|}{|1 + m + r|}$$

$$N_r = \frac{|r|}{|1 + m + r|}$$

The variables have the same definitions described for the previous operation. One advantage of the two normalization operations described here is that they yield real normalized values in spite of being applied to complex signal values. However, normalization operations are, of course, possible in which the normalized values are also complex.

The method according to the present invention illustrated in FIG. 3 preferably uses the first of the two normalization operations described above. The pattern values of the antenna patterns of the k receiving beams normalized by this complex normalization operation are designated $knD_k(a)$ and are stored in a memory area of analysis computer 19 in Step 30. Echo signals from each of the k receiving beams are recorded in Step 31. In Step 32, each of these recorded echo signals is subjected, in the form of a complex echo signal with amplitude and phase, to the same normalization operation as stored pattern values $knD_k(a)$. In Step 32, this yields a complex normalized echo signal $knE_k$ for each receiving beam k. Like in Step 24 in FIG. 2, the normalized echo signals are now compared to the stored, angle-dependent pattern values in Step 33. The comparison is preferably carried out by forming a difference function $B_k(a)$. In contrast to the first embodiment shown in FIG. 2, this difference function $B_k(a)$ includes phase information about the recorded echo signals on the basis of the complex normalization operation used. In Step 34, an angle-dependent analysis quantity $S(a)$ is again formed and used to combine the comparison results of at least two receiving beams, preferably the k receiving beams. In Step 35, the probable angle of a detected radar target is then determined, like in Step 28.

What is claimed is:

1. A method for determining at least one of an azimuth angle and an elevation angle of at least one radar target, the at least one radar target located at a distance from a multibeam radar system, the method comprising the step of:

recording, with the multibeam radar system, a plurality of echo signals of the at least one radar target using a plurality of beams;

normalizing an amplitude of the recorded echo signal in each particular receiving beam of the plurality of beams;

for each particular receiving beam of the plurality of beams, storing pattern values of an antenna pattern of the particular receiving beam;

normalizing the pattern values;

for each particular receiving beam of the plurality of beams, comparing the normalized amplitude of the recorded echo signal to the stored and normalized pattern values for generating corresponding comparison results;

combining the corresponding comparison results for at least two receiving beams to form an angle-dependent analysis quantity, the angle-dependent analysis quantity including a phase angle of the recorded echo signals; and determining at least one of the azimuth angle and the elevation angle to be an angle whose angle-dependent analysis quantity corresponds to one of a maximum criterion and a minimum criterion.

2. The method according to claim 1, further comprising the step of:

before the combining step and for each particular receiving beam of the plurality of beams, forming first difference functions to compare the normalized amplitude of the recorded echo signal to the stored and normalized pattern values, wherein the combining step includes the substep of adding the first difference functions of the at least two receiving beams to form the angle-dependent analysis quantity.

3. The method according to claim 2, further comprising the steps of:

before the combining step, determining a phase difference between the recorded echo signals of the at least two receiving beams; and comparing the determined phase difference to stored angle-dependent phase difference values of the at least two receiving beams to generate further comparison results, wherein the angle-dependent analysis quantity includes the further comparison results.

4. The method according to claim 3, further comprising the steps of:

before the combining step, forming a second difference function for comparing the determined phase difference to the stored angle-dependent phase difference values; and weighting the second difference function using an amplitude factor, wherein the combining step includes the substep of adding the weighted second difference function to an added sum of the first difference functions of the at least two receiving beams.

5. The method according to claim 1, further comprising the steps of:

before the comparing step, determining a phase difference between the recorded echo signals of the at least two receiving beams; and comparing the determined phase difference to stored angle-dependent phase difference values of the at least two receiving beams to generate further comparison results, wherein the angle-dependent analysis quantity includes the further comparison results.

6. The method according to claim 1, wherein the recorded echo signals and the pattern values of the antenna pattern are normalized using complex signal values, the complex signal values including the amplitude of the recorded echo signal and one of the phase angle of the recorded echo signals and the pattern values.

7. A device for determining at least one of an azimuth angle and an elevation angle of at least one radar target, the at least one radar target located at a distance from a multibeam radar system, the device comprising:

a first arrangement recording a plurality of echo signals of the at least one target over at least two receiving beams of a plurality of beams;

a second arrangement normalizing an amplitude of the recorded echo signal in each particular receiving beam of the plurality of beams;

a third arrangement normalizing pattern values of antenna patterns of the at least two receiving beams of the plurality of beams, the third arrangement storing the normalized pattern values;

a fourth arrangement forming a difference function between the recorded and normalized echo signals and the stored and normalized pattern values for each of the at least two receiving beams;

a fifth arrangement forming an analysis quantity as a function of the at least two formed difference functions, the fifth arrangement receiving a further quantity indicative of a phase angle of the recorded echo signals; and a sixth arrangement determining a minimum value of the analysis quantity.

\* \* \* \* \*

UNITED STATES PATENT AND TRADEMARK OFFICE
CERTIFICATE OF CORRECTION

PATENT No. : 6,130,638

DATED : October 10, 2000

INVENTOR(S): Winter, et al.

It is certified that error appears in the above-identified patent and that said Letters Patent is hereby corrected as shown below:

Col. 2, line 55 delete "a" and insert --α--

Col. 3, line 18, delete "$\Phi_{kl}$" and insert --$\varphi_{k1}$--

Col. 3, line 20, delete "$\Phi_{kl}$" and insert --$\varphi_{k1}$--

Col. 3, line 28, delete "$\Phi_{kl}$" and insert --$\varphi_{k1}$--

Col. 3, line 31, delete "$\Phi_{kl}$" and insert --$\varphi_{k1}$--

Col. 3, line 36, delete "$\Phi_{kl}$" and insert --$\varphi_{k1}$--

Col. 3, line 37, delete "$\Phi_{kl}$" and insert --$\varphi_{k1}$--

Signed and Sealed this

Fifteenth Day of May, 2001

*Attest:*

NICHOLAS P. GODICI

*Attesting Officer*     *Acting Director of the United States Patent and Trademark Office*